Nov. 21, 1939.　　　B. M. CARTER　　　2,180,727
MANUFACTURE OF SULPHURIC ACID
Filed July 24, 1937
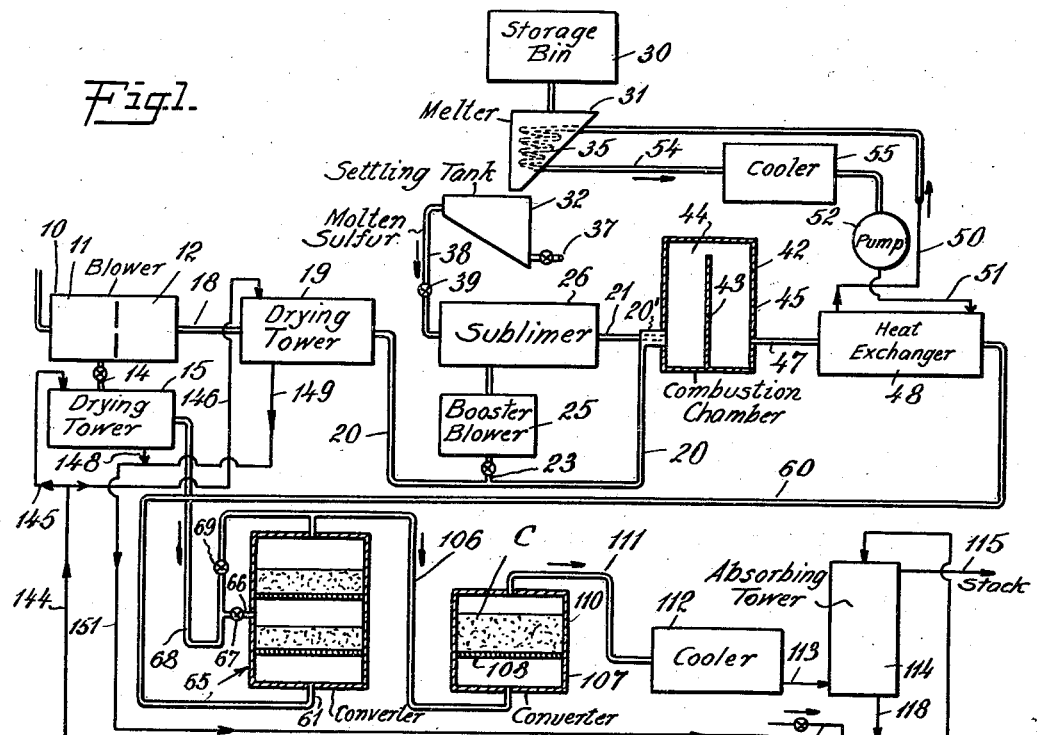
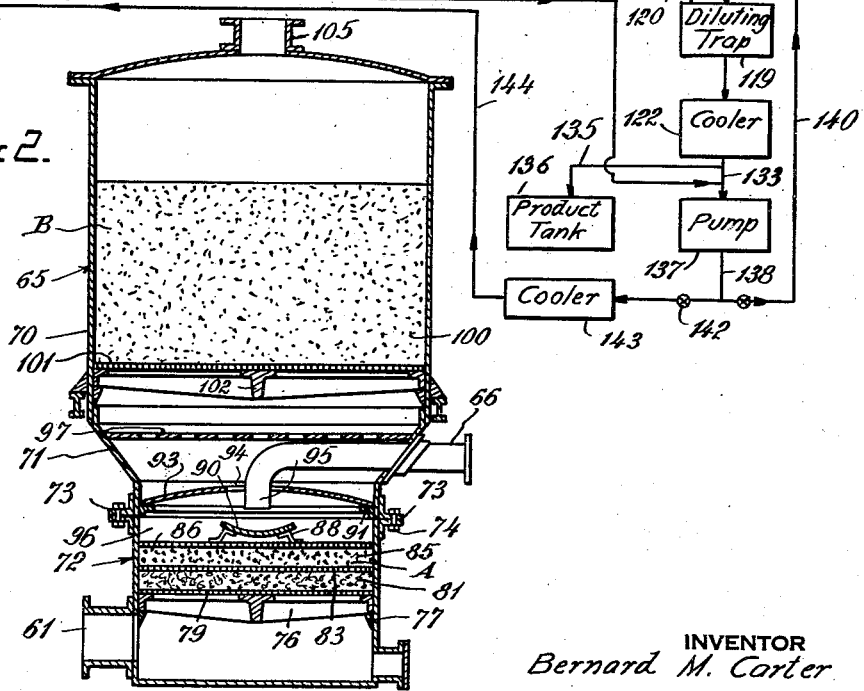
INVENTOR
Bernard M. Carter
BY
ATTORNEY Patented Nov. 21, 1939

2,180,727

UNITED STATES PATENT OFFICE 2,180,727

MANUFACTURE OF SULPHURIC ACID

Bernard M. Carter, Montclair, N. J., assignor to General Chemical Company, New York, N. Y., a corporation of New York Application July 24, 1937, Serial No. 155,528

2 Claims. (Cl. 23—175)

This application is a continuation in part of my co-pending application Serial No. 703,234, filed December 20, 1933.

The invention relates to the manufacture of sulphuric acid.

The principal objects of the invention lie in the provision of methods and apparatus for making sulphuric acid by the contact process, employing such substances as elemental sulphur, hydrogen sulphide, iron sulphide, or other suitable materials as sources of sulphur dioxide. The invention comprises method and apparatus improvements exemplified in the following specification, and further includes the several steps of the process and the relation of one or more of such steps with respect to each of the others, and apparatus embodying the features of construction, combinations of elements and arrangement of parts adapted to carry out the process steps. Although the principles of the invention are applicable in the manufacture of sulphuric acid by the contact process when using any suitable material such as brimstone, hydrogen sulphide, or iron pyrites as sources of sulphur dioxide, a full understanding of the principles, objects and advantages of the invention may be had from consideration of the following illustrative example in which brimstone is used as a source of sulphur dioxide. This embodiment of the invention may be described in connection with the accompanying drawing, in which Fig. 1 illustrates, partly in section and partly diagrammatic, a plant lay-out of apparatus which may be employed when using brimstone as a source of sulphur dioxide, and Fig. 2 is an enlarged, vertical section showing structural details of one form of a converter constituting part of the invention.

Referring to Fig. 1 of the drawing, 10 indicates a blower having a low pressure stage 11 and a high pressure stage 12. Stage 11 pumps air at low pressure through valve-controlled line 14 into the bottom of drying tower 15. The low pressure stage also communicates with high pressure stage 12 which supplies air thru line 18 to the bottom of drying tower 19. Towers 15 and 19 may be of any approved construction.

Dried air discharged from the top of tower 19 passes through conduit 20 which terminates in an enlarged elbow 20'. Part of the air in line 20 is withdrawn through valved pipe 23 by a booster blower 25 which feeds air into sulphur sublimer 26 at a pressure greater than that prevailing in line 20.

Sublimer 26 may be of any suitable construction, but is preferably of the type disclosed in Gillett U. S. Patent 1,832,013 of November 17, 1931. In sulphur vaporizing apparatus of this kind provision is made for maintaining therein a pool of molten sulphur into the bottom of which a controlled supply of air is introduced by such means as booster blower 25. Molten sulphur for the sublimer is provided by apparatus comprising principally a storage bin 30, sulphur melter 31 and a settling tank 32. Any appropriate mechanism may be employed for feeding regulated quantities of sulphur from the bin into the melter vat having at the bottom a valve or tap through which molten sulphur runs into settling tank 32. Heat for melting sulphur is preferably provided by hot liquid circulated through a heating coil 35. The settling tank 32 is desirably constructed with a sloping bottom disposed so that impurities may be discharged through a valved tap 37. Molten sulphur flows from the upper part of the tank through a pipe 38, controlled by valve 39, into the chamber of sublimer 26. In practice, the storage bin, the melter and the settling tank are preferably disposed above the sublimer and arranged one beneath the other in the order named as illustrated in the drawing so that the movement of sulphur from bin 30 into the sublimer 26 is by gravity, thus eliminating use of pumps and extensive jacketed sulphur lines and attendant difficulties. Tank 32 and pipe 38 may be suitably lagged to prevent chilling of the sulphur.

The mixture of sulphur vapor and sulphur dioxide discharged from sublimer 26 enters line 21 which passes axially through elbow 20' and opens into the bottom of combustion chamber 42 which may be circular in horizontal cross-section and provided with a central vertical partition 43 forming connecting chambers 44 and 45 in which sulphur vapor is burned to sulphur dioxide. Combustion products leave the bottom of chamber 45 and pass through conduit 47 into a heat exchanger 48. The latter may be constructed to include one or more series of coils or tubes for cooling fluid connected at one end to an outlet pipe 50 and at the other end to an inlet pipe 51 communicating with the pressure side of pump 52. The cooling coils are preferably arranged so that cooling liquid passes through the heat exchanger in a direction generally countercurrent to the flow of hot sulphur dioxide gas. Pipe 56 is connected to one end of heating coil 35 the opposite end of the coil opening into pipe 54 by means of which liquid may be passed, if desired, through a cooler 55, and thence to the inlet side of pump 52.

The cooled exit gas of exchanger 48 flows through line 60 connected to the inlet 61 of a converter designated generally by 65. Dried air may be supplied to the converter through an inlet pipe 66, provided with a control valve 67, communicating with air line 68 connected at the opposite end to the air outlet at the top of drying tower 15.

Converter 65, Fig. 2, comprises principally an enlarged cylindrical section 70, a tapered intermediate portion 71 and a removable section indicated generally by 72. The lower edge of portion 71 is formed with a flange 73 to which the removable section 72 may be detachably connected as by bolts 74.

Referring to the construction of the removable section, a grid 76 rests on the circular angle iron 77 and supports a screen or perforated plate 79 on which may be placed filtering material 81, such as crushed fire-brick. Disposed upon the upper surface of the filtering material is a second perforated plate 83 forming a support for a bed of catalytic material 85 constituting conversion stage A. With a sulphur dioxide gas relatively free of impurities the filtering material may be omitted. The top of catalytic material 85 is covered by another perforated plate 86 supporting on suitable brackets 88 a saucer-like disc 90. Carried by circular ledge 91 is an arched dome or partition 93 having in the top a circular opening 94 through which projects the downwardly directed outlet end 95 of air inlet pipe 66. Partition 93, plate 86 and the associated portion of the shell form a mixing chamber 96. Further mixing of gases rising through the converter is effected by a circular perforated plate 97 prior to entry of such gases into a second body of catalytic material 100, comprising conversion stage B, resting on screen or perforated plate 101 in turn supported by grid 102. The upper portion 70 of the converter is preferably circular in horizontal section and is of a diameter substantially greater than that of removable portion 72. By this arrangement, a body of catalyst 100 of increased volume may be employed without corresponding increase in depth, and resistance to the flow of gas through the converter is not increased.

The outlet 105 of converter 65 is connected to a gas line 106 (Fig. 1) through which the gas stream flows into the lower end of a second converter 107 provided with a horizontally disposed screen or perforated plate 108 carried by a suitable grid for supporting a third body of catalytic material 110 constituting conversion stage C.

The exit gases of the converter system pass through pipe 111 and into the absorbing system through cooler 112. From the latter, cooled gases are conducted through line 113 into the bottom of an absorbing tower 114 from the top of which unabsorbed gases are discharged through line 115 to the plant stack. Acid collecting in the bottom of tower 114 runs through pipe 118 to a diluting trap 119 into which water or weak acid may be introduced through a valved inlet 120. From trap 119 the diluted acid flows through a cooler 122 discharging into a pipe 133. Part of the acid in line 133 may be tapped off through pipe 135 into a product tank 136, the balance of the acid in line 133 being drawn into pump 137, the pressure side of which discharges into a header 138.

A controlled part of the acid in header 138 is passed through pipe 140 to the top of absorbing tower 114. By adjustment of valve 142, a desired portion of acid from the header 138 is introduced into cooler 143, and flows thence through pipes 144, 145, and 146 to the tops of drying towers 15 and 19. Acid discharged from the bottoms of towers 15 and 19 through pipes 148 and 149 flows through line 151 into pipe 133 connected to the inlet side of pump 137.

Following is a preferred procedure for carrying out that embodiment of the process of the invention when using brimstone as the source of sulphur dioxide.

Blower 10 may be operated so that low pressure stage 11 discharges a desired amount of air at pressure of say one pound through pipe 14 into the bottom of tower 15, and so that high pressure stage 12 delivers air through line 18 to the bottom of tower 19 at about 2 pounds pressure. The acid employed for drying the air in towers 15 and 19 is about 99% sulphuric acid. Otherwise, the drying operation is carried out as usual in the art. Dried air from tower 19 flows through conduit 20 into pipe 23 and through elbow 20' into the combustion chamber. Brimstone from storage bin 30 is fed in desired regulated quantities into melter 31 in which sulphur is melted and maintained in molten condition by heat from hot liquid, such as a relatively heavy oil or diphenyl oxide, circulated through heating coil 35. The valved tap at the bottom of the melter casing may be adjusted to provide for a steady flow of sulphur from melter 31 into tank 32 in which impurities are settled out and from time to time discharged from the apparatus through outlet 37. Molten sulphur runs thence through pipe 38 into sublimer 26.

As already observed, sublimer 26 is preferably of the type shown in the Gillett patent. A pool of molten sulphur of suitable depth is maintained in the chamber of the sublimer by adjustment of valve 39. By means of booster blower 25, a controlled quantity of air at pressure slightly higher than that existing in line 20 is fed preferably into the bottom of the body of molten sulphur in the sublimer. The amount of air thus introduced is regulated to provide oxygen to effect burning of a sufficient amount of sulphur to generate heat enough to vaporize the balance of the sulphur. By suitably adjusting the amount of air charged into the sublimer by the booster blower, approximately 15% of the total amount of sulphur in the sublimer may be burned to sulphur dioxide, the heat generated by oxidation serving to vaporize the balance of the sulphur. The mixture of sulphur vapor and sulphur dioxide thus formed at temperatures of about 700° F. enters pipe 21 and passes into the combustion chamber. Introduction of air directly into the combustion chamber avoids chilling the sublimer gas in pipe 21 with possible condensation of sulphur, as might take place, if the cool air and sublimer gas were mixed outside the combustion chamber.

An understanding of the invention may be had by diverging at this point from description of the present specific example to discuss the principles upon which the invention is based.

As known, sulphur dioxide reacts with oxygen to produce sulphur trioxide in accordance with the equation $2SO_2 + O_2 \rightarrow 2SO_3$. In practice, what is known as commercially complete conversion may not be obtained unless gas compositions are controlled so that the outlet gas of the last conversion stage contains a certain percentage of free oxygen. This requirement necessitates (in commercial practice prior to this invention) the feeding into the inlet of the first conversion stage of two quantities of oxygen (1) the stoichiometric quantity of oxygen required to oxidize the sulphur dioxide present, and (2) the excess of oxygen needed in practice to make possible commercially complete conversion of the sulphur dioxide. According to specific conditions encountered in practice, the per cent of free (or excess) oxygen in the tail gas of the last conversion stage may vary. Ordinarily, in prior commercial practice using gases of say 10 to 11% $SO_2$ concentration, the per cent of volume of free oxygen in the converter system tail gas should be not less than about 4.8, the more usual amount of good commercial practice being not less than about 5%.

In accordance with the above equation, two volumes of $SO_2$ react with one volume of oxygen to produce two volumes of $SO_3$, with the result that there is a shrinkage of gas volume on account of the consumption of oxygen. It will be understood that since the amount of the "excess" oxygen present during the reaction does not change during the course of the reaction, if a tail gas containing 5% free oxygen is needed, the per cent of excess oxygen in the inlet gas will be something less than 5%. For example, when a gas passed into a converter system has an $SO_2$ content of about 11% the gas stream in ordinary operation (that is not using the present invention) should contain not less than about 10% oxygen, 5.5% for oxidation of the $SO_2$ to $SO_3$, and about 4.5% excess. This will give about 4.8% oxygen in the converter system tail gas on account of the small reduction in volume as a result of the reaction $2SO_2+O_2 \rightarrow 2SO_3$. However, as mentioned above, the 5% oxygen in the tail gas may vary to some extent in accordance with the $SO_2$ concentration of the gas used in the converter system. In the case of weak $SO_2$ gases the per cent of free oxygen in the tail gas may be something less than 5%, and in the case of stronger gases the "excess" may be something greater. It will be understood the "excess" referred to in this specification is whatever particular excess may be most advantageous, under the specific operating conditions, to supply the excess of oxygen needed in practice for commerically complete conversion of sulphur dioxide.

In accordance with the invention, it has been found that substantial operating economies may be had where formation of the initial sulphur dioxide-oxygen gas mixture is effected so as to form a gas mixture containing sulphur dioxide and oxygen in amount by volume less than that needed in practice for commercially complete conversion of such sulphur dioxide and having a sulphur dioxide-oxygen ratio by volume of not less than about 1.33 sulphur dioxide to one oxygen. In all modifications of the invention, whether brimstone, hydrogen sulphide, pyrites or other suitable raw material may be used as the source of sulphur dioxide, formation of the initial sulphur dioxide-oxygen gas mixture is controlled as mentioned. Generally, the greater the deficiency of oxygen, the greater are the operating advantages obtained. For this reason, in the more preferred embodiments of the invention formation of the initial sulphur dioxide-oxygen gas mixture is controlled so as to produce a gas mixture having a sulphur dioxide-oxygen ratio by volume of not less than about 1.47 sulphur dioxide to one oxygen. A further feature of importance with regard to the nature of the gas entering the first conversion stage is that in order to obtain most desirable results the composition of the entering gas should be such as to effect not less than about 50% conversion in the first stage. To this end formation of the initial $SO_2$-oxygen gas mixture should be carried out so that the inlet gas contains preferably not less than half as much oxygen by volume as $SO_2$. In carrying out the present multi-stage conversion operation, as will hereafter more fully appear, procedure is such that there are introduced between stages further quantities of oxidizing gas serving the dual function of cooling the gas intermediate conversion stages to approximately initial conversion temperature so that reaction may proceed in the succeeding stage, and also of supplying the further amounts of oxygen needed to react with sulphur dioxide to form $SO_3$.

With foregoing principles of the invention in mind, further reference may now be had to the specific example in which brimstone is used as the source of $SO_2$.

In combustion chamber 42 sulphur vapor is burned with dried air. In this example to obtain most economic results, the amount of air used in burning the sulphur vapor is controlled so as to produce a gas mixture containing preferably about 14% sulphur dioxide, about 7% oxygen, and 79% nitrogen. It will be seen such combustion operation is regulated so that there is produced a gas mixture containing sulphur dioxide and oxygen in amount by volume about half the sulphur dioxide, less oxygen than that needed in practice for commercially complete oxidation of sulphur dioxide to sulphur trioxide, and having a sulphur dioxide-oxygen ratio by volume of two to one.

The exit gas of the combustion chamber at temperatures of about 2000–2200° F. is introduced into the heat exchanger 48 and cooled by heat interchange with heavy oil or other suitable liquid to about 775–780° F.

One feature of the process involves the utilization of heat abstracted from the hot gases to melt sulphur in melter 31. Cool oil, at temperatures of about 400° F., is forced by pump 52 through pipe 51 into the cooling coils in the heat exchanger, the heated oil leaving the exchanger by pipe 50. By regulation of the pump, flow of oil is controlled so as to cool the hot sulphur dioxide gas to the desired temperature. Hot oil, heated in the exchanger to say 600° F., runs through pipe 50 into the heating coil 35 in the sulphur melter, heat of the oil being utilized to melt the sulphur consumed in the process. Cooled oil is returned to pump 52 through pipe 54 and cooler 55 which may be dispensed with if the oil has become sufficiently cooled.

The cooled exit gas of the heat exchanger flows through pipe 60 to converter inlet 61. The following illustrative example of operation of the converter is based on introduction through inlet 61 of 100 volumes of gas containing by volume about 14% sulphur dioxide, about 7% oxygen and about 79% nitrogen. The catalyst employed in all stages of the process is preferably a vanadium catalyst, such as disclosed in Slama-Wolf U. S. P. 1,371,004, March 8, 1921, or any other catalyst such as platinum on a suitable granular carrier may be employed.

In the process of the invention, since all of the gases involved in the conversion operation are not fed into the converter initially to pass through the A-stage of conversion, the volume of catalyst comprising the latter may be reduced. The volume of the body of catalyst 85 may be about 70% of that normally employed in the A-stage of conversion, and such volume is less than normally employed in the A-stage in inverse proportion to the increase in strength of the gas introduced into the A-stage. About 55-60% conversion may be effected in the A-stage, and the resulting gas, after about 55% conversion, passing through perforated plate 86 may be at temperatures around 1185-1200° F. and comprise about 6.6% $SO_2$, 8.0% $SO_3$, 3.3% oxygen, and 82.1% nitrogen. Such gas requires additional oxygen to effect completion of conversion of the sulphur dioxide to sulphur trioxide, and also requires cooling before oxidation of sulphur dioxide can be continued. In accordance with the invention, additional air is introduced into the converter, intermediate conversion stages A and B (1) to reduce the temperature of the resulting gas stream to initial conversion temperature and (2) to make up the oxygen deficiency. For this purpose about 60 volumes of dried air at approximately 100° F. may be fed into the converter from drying tower 15 into pipe 68 and converter inlet pipe 66. The air introduced through pipe 66 impinges on the upper surface of disc 90, reversing the direction of flow of the air stream and securing good mixing with the partly converted gases rising through perforated plate 86 from the A conversion stage. Introduction of air between stages A and B in quantity necessary to cool the gas stream down to about initial conversion temperature, in the case of an initial gas having an $SO_2$-$O_2$ ratio of 2:1 or less than two sulphur dioxide to one oxygen, automatically introduces the required amount of oxygen needed to effect commercial conversion of sulphur dioxide to sulphur trioxide. Gas passing through opening 94 may be at temperature of about 790° F. and contains about 4.1% $SO_2$, 4.9% $SO_3$, 10.1% oxygen, and 80.9% nitrogen.

A gas mixture of this nature after mixing by passing through perforated plate 97 enters the B conversion stage. Preferably the area of the enlarged section 70 is greater than the area of the lower section in direct proportion to increased gas volume. This provides for handling the increased gas volume and for an increase in total volume of the catalyst body without increasing the depth of the body to such an extent as would cause an increase in resistance to gas flow through the B-stage in excess of increased resistance normally created in the B-stage of an ordinary converter system. In the B-stage, total conversion is brought up to about 90%, and the gas mixture at temperature of about 960° F. and containing by volume about 0.9% $SO_2$, 8.2% $SO_3$, 8.7% oxygen and 82.2% nitrogen leaves the converter 65 through outlet 105.

The oxidation operation is completed in the C-stage 110 in converter 107. For the purpose of cooling the gas stream to about 790° F., prior to admission to converter 107, approximately 40 volumes of dried air at about 100° F. may be introduced into conduit 106 from line 68 by adjustment of valve 69. After addition of air, the gas stream may contain by volume about 0.7% $SO_2$, 6.5% $SO_3$, 11.2% oxygen, and 81.6% nitrogen. The cross-sectional area of the C-stage is greater than that of the B-stage in direct proportion to increase in gas volume between the B and C stages. Thus, advantages mentioned above in connection with the B-stage are also obtained in the C-stage. In the C-stage, approximately 98% conversion may be obtained, and the resulting gas mixture at temperatures of about 830° F., and containing about 0.1% $SO_2$, 7.1% $SO_3$, 11.0% oxygen, and 81.8% nitrogen, flows through line 111 into cooler 112.

After temperature reduction to about 400-600° F. in cooler 112, the gas stream is introduced into the bottom of the absorbing tower 114 in which absorption takes place in the usual manner, unabsorbed gases being discharged from the system through pipe 115. The acid discharged from the bottom of tower 114 may be at temperatures of about 200-260° F. and of about 99.5-99.7% concentration. In trap 119 sufficient water or weak acid may be introduced to dilute the acid in the system to about 99.0-99.2%. The acid runs thence into cooler 122 in which the temperature of the acid is reduced to about 180-200° F. An amount of the acid representing the production may be tapped off from pipe 133 through line 135 into product tank 136. The balance of the acid in pipe 133 is discharged by pump 137 into header 138 from which the acid requirements of the absorbing tower are withdrawn through pipe 140, and returned to the top of the absorbing tower 114.

In accordance with the present method, a common acid circulating system is used for the absorption and drying systems. By control of valve 142, the acid to be used in the drying system is run into cooler 143 in which the temperature of the acid is reduced to about 100° F. The acid then flows through lines 144, 145 and 146 to the tops of drying towers 15 and 19. In the drying operation, the temperature of the acid may be increased to about 140-150° F., and the concentration reduced to about 98%. The acid discharged from towers 15 and 19 through pipes 148 and 149 runs through conduit 151 back into pipe 133 and is thus returned to the circulating pump 137.

The principles of the invention may also be applied to utilization of gases of $SO_2$ concentration higher than previously mentioned. For instance, combustion of brimstone or other sulphur may be controlled so as to effect formation of a gas mixture having a sulphur dioxide-oxygen ratio by volume of more than two sulphur dioxide to one oxygen. To illustrate, combustion of brimstone may be regulated so as to produce a gas containing say 16% $SO_2$, 6% oxygen, and 79% nitrogen, in which case the gas would contain oxygen in amount substantially less than that needed in practice for commercially complete oxidation of sulphur dioxide to sulphur trioxide and would have a sulphur dioxide-oxygen ratio of about 2.66 sulphur dioxide to one oxygen. Such a gas mixture, however, would contain less than half as much oxygen as sulphur dioxide and might not be used to any particular advantage in a system where it is desired to employ a minimum number of conversion stages, since as explained above where the gas entering the A conversion stage contains less than about half as much oxygen as sulphur dioxide the maximum conversion obtainable in the first stage is not usually secured. However, a strong gas mixture of this nature may well be used to advantage in any system where the number of conversion stages employed is of no particular importance and it is not especially essential to obtain the highest possible conversion in the A-stage.

In the example where combustion of brimstone was regulated so as to produce a gas containing 14% $SO_2$, 7% oxygen, and 79% nitrogen (such gas having a sulphur dioxide-oxygen ratio of two to one), it will be noted the air introduced between the A and B conversion stages served two purposes: (1) to cool the gas stream to initial conversion temperature and (2) to introduce automatically the remainder of the oxygen needed to effect commercially complete conversion of the sulphur dioxide to sulphur trioxide. In the case of stronger gases, (i. e. having a sulphur dioxide-oxygen ratio appreciably greater than two sulphur dioxide to one oxygen), introduction of a sufficient amount of air between the A and B stages to cool the gas stream to initial conversion temperature does not introduce oxygen in quantity to effect commercially complete oxidation of the sulphur dioxide. In this situation, the air introduced between the B and C stages in quantity to cool the gas stream to initial conversion temperature, automatically introduces the additional amount of oxygen required.

The invention is also applicable to utilization of gases of lower $SO_2$ concentration than previously mentioned and obtained from other sources of $SO_2$ such as by combustion of pyrites or of hydrogen sulphide. For example, pyrites fines may be roasted in suspension in the general way disclosed in Cordy et al. U. S. Patent 1,758,188 of May 13, 1930. Sulphur dioxide gases produced by combustion of sulphides in this manner are usually subjected to wet purification methods such as shown for instance in Herreshoff U. S. Patents 940,595 of November 16, 1909, and 1,113,437 of October 13, 1914. When proceeding in accordance with this modification, the quantity of air used in the burner to effect combustion of the sulphide fines may be controlled so as to produce a gas which after purification and on entering the converter system may contain say 10.4% $SO_2$, 7.8% oxygen, and 81.8% nitrogen. Such gas cantains oxygen in amount less than that needed in practice for commercially complete oxidation of sulphur dioxide and has a sulphur dioxide-oxygen ratio by volume of about 1.33 sulphur dioxide to one oxygen. As a further example, the amount of air used in combustion of the fines may be controlled so as to produce a gas which after purification contains about 11.9% $SO_2$, 5.9% oxygen, and 82.1% nitrogen. Such gas mixture likewise contains oxygen in amount less than that needed for commercially complete oxidation of sulphur dioxide to sulphur trioxide, but has a sulphur dioxide-oxygen ratio by volume of about 2:1.

Hydrogen sulphide also constitutes a particularly suitable source of sulphur dioxide for the purposes of the invention. Gases containing hydrogen sulphide of concentrations of say 30% and upward are readily available in commercial quantities. A relatively concentrated hydrogen sulphide of this nature may be burned with air in any suitable combustion chamber so as to produce gas mixtures having sulphur dioxide-oxygen ratios of the order discussed herein. For example, a gas mixture containing approximately 92.5% $H_2S$, 2.4% $CO_2$, and small quantities of gaseous and vaporous substances may be introduced into a combustion chamber and burned with such regulated amount of air as to produce a gas mixture containing by volume say 8.5% $H_2O$, 8.1% $SO_2$, 6.1% $O_2$, 76% $N_2$ and 1.2% $CO_2$. Such gas mixture has a sulphur dioxide-oxygen ratio of about 1.33:1. Further, hydrogen sulphide may be burned with such amount of air as to form a gas mixture containing by volume 9.6% $H_2O$, 9.1% $SO_2$, 4.5% $O_2$, 75.7% $N_2$, and 1.3% $CO_2$, in which instance the gas has a sulphur dioxide-oxygen ratio of about 2:1. Such gas mixtures are then introduced into the A conversion stage.

In each of the foregoing examples where the initial sulphur dioxide gas is obtained from sources such as combustion of pyrites or hydrogen sulphide, the sulphur dioxide gas contains in amount by volume less than that needed to effect commercially complete oxidation of sulphur dioxide. In these instances the procedure involved in utilizing such gases in the converter system shown in the drawing is the same as explained above in the situation where the initial sulphur dioxide gas is obtained by combustion of brimstone. In such modifications any suitable means may be used subsequent to the last conversion stage to effect recovery of sulphur trioxide as sulphuric acid.

In all of the examples, combustion of sulphurous raw material is controlled so as to form an initial gas having a sulphur dioxide-oxygen ratio of not less than 1.33 sulphur dioxide to one oxygen, regardless of whatever and particular $SO_2$ concentration may be. When working with the preferred sulphur dioxide-oxygen ratio, operations are similarly conducted except that combustion of the sulphurous raw material is regulated so as to form an initial gas having a sulphur dioxide-oxygen ratio of not less than about 1.47 sulphur dioxide to one oxygen.

The invention provides material operating advantages with regard to both method and apparatus. As to melting and handling of sulphur prior to introduction into sublimer 26, when using brimstone as source of sulphur dioxide, it is to be noted the movement of sulphur from the bin 30 through the melter and settling tank and supply pipe 38 to the sublimer is all by gravity. Pumps for molten sulphur and extensive jacketed sulphur lines are thus eliminated, a factor which is of considerable importance with respect to installation and especially maintenance costs. Operation of the combustion chamber is controlled so as to produce gas mixtures of relatively high $SO_2$ concentrations. Use of concentrated gas makes possible the employment of materially smaller apparatus and gas lines in the system beyond the combustion chamber. Furthermore, in the production of strong gases, relatively large quantities of heat are generated, which heat is generally in excess of that needed to provide molten sulphur required in the system. One feature of the process involves cooling the hot gases from the combustion chamber to optimum initial conversion temperature by heat transfer to a heavy liquid such as heavy oil or diphenyl oxide, and utilizing the heat thus recovered to melt sulphur. The use of liquid as a cooling medium reduces the area of the surface which would be required if a gas were employed, and at the same time the power required for circulating cooling medium is reduced.

In addition to advantages previously mentioned relative to improved conversion operation arising from the converter construction including a restricted lower portion and an enlarged upper section, the converter is built so that lower section 72 may be readily removed. The lower part of the converter, containing the filtering material and the catalyst of the A-stage, may be conveniently located adjacent the floor of the plant and may be easily handled, when changing filtering material and catalytic material 85, with a minimum of scaffolding and equipment. The arrangement of the first and second stages of conversion in the same shell, and introduction of cooling air between the conversion stages eliminates the use of separate vessels for cooling intermediate the A and B conversion stages, and thus conserves space. In converter 65 and also converter 107 it will be observed the gas stream flows upwardly through the body of catalytic material. This feature apparently minimizes channeling and local overheating, and promotes conversion.

The common acid circulating system employed for both the absorbing and drying systems eliminates the use of additional pumps and acid lines. It has been found that when operating a system under positive pressure, that is, by installing a blower at the head of the train of apparatus elements, a strong acid such as 99% acid, the same acid as employed for absorbing, may be used to advantage in the drying towers. As the blower precedes the drying tower, any sulphuric acid mist which may be picked up in the drying towers by the air is carried directly into the high temperature atmosphere of the combustion chamber and is thus not harmful to apparatus. Hence, in this system, the same acid used for absorption may be employed in the drying apparatus.

The introduction of low pressure air into the converter directly from the low pressure stage of a multi-stage blower such as blower 19 is another feature of the invention. As a substantial portion of the air used in the process is fed into the main gas stream at points just ahead of the second and third conversion stages, it is unnecessary to pass this portion of air at a higher pressure through the sublimer, combustion chamber and heat exchanger. Thus, since this portion of air is by-passed around such elements and fed directly into the converter system, it is necessary to raise the maximum pressure only about half of all the air used in the process.

I claim:

1. The method for catalytically making sulphur trioxide in a plurality of stages which comprises forming a gas mixture containing sulphur dioxide and oxygen in amount by volume less than that needed in practice for commercially complete conversion of such sulphur dioxide, contacting the gas mixture at reactive temperature with a first body of catalytic material of given cross-sectional area and of volume substantially less than that normally employed when all the gases involved in the conversion reaction are passed through said first body of catalytic material whereby part of the sulphur dioxide is oxidized to sulphur trioxide, the temperature of the gas mixture increased and the oxygen content diminished, introducing further quantities of oxidizing gas at relatively low temperature into the partically oxidized gas mixture to cool the gas mixture to approximate initial conversion temperature and to supply oxygen needed for oxidation of further amounts of sulphur dioxide, whereby the gas volume is substantially increased, and then passing the resulting gas mixture in contact with a second body of catalytic material having a cross-sectional area greater than the area of the body of catalytic material of the preceding stage in direct proportion to the increase in gas volume between the stages.

2. The method for catalytically making sulphur trioxide in a plurality of stages which comprises forming a gas mixture containing sulphur dioxide and oxygen in amount by volume not less than about half the sulphur dioxide and less than that needed in practice for commercially complete conversion of sulphur dioxide, contacting the gas mixture at reactive temperature with a first body of catalytic material of given cross-sectional area and of volume substantially less than that normally employed when all the gases involved in the conversion reaction are passed through said first body of catalytic material whereby part of the sulphur dioxide is oxidized to sulphur trioxide, the temperature of the gas mixture increased and the oxygen content diminished, introducing further quantities of oxidizing gas at relatively low temperature into the partially oxidized gas mixture to cool the gas mixture to approximate initial conversion temperature and to supply oxygen needed for oxidation of further amounts of sulphur dioxide, whereby the gas volume is substantially increased, and then passing the resulting gas mixture in contact with a second body of catalytic material having a cross-sectional area greater than the area of the body of catalytic material of the preceding stage in direct proportion to the increase in gas volume between the stages.

BERNARD M. CARTER.